United States Patent
Lee et al.

(10) Patent No.: US 10,315,645 B2
(45) Date of Patent: Jun. 11, 2019

(54) METHOD FOR CONTROLLING GEAR SHIFTING OF HYBRID ELECTRIC VEHICLE

(71) Applicants: Hyundai Motor Company, Seoul (KR); Kia Motors Corporation, Seoul (KR)

(72) Inventors: Chan Ho Lee, Seoul (KR); Jeong Soo Eo, Hwaseong-si (KR); Jae Sung Bang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 8 days.

(21) Appl. No.: 15/826,309

(22) Filed: Nov. 29, 2017

(65) Prior Publication Data

US 2019/0092313 A1 Mar. 28, 2019

(30) Foreign Application Priority Data

Sep. 25, 2017 (KR) .......................... 10-2017-0123126

(51) Int. Cl.
*B60W 10/06* (2006.01)
*B60W 10/08* (2006.01)
(Continued)

(52) U.S. Cl.
CPC ............ *B60W 20/10* (2013.01); *B60W 10/06* (2013.01); *B60W 10/08* (2013.01); *B60W 10/11* (2013.01);
(Continued)

(58) Field of Classification Search
CPC ...... B60W 20/10; B60W 10/06; B60W 50/00; B60W 30/19; B60W 10/11; B60W 10/08; B60W 2540/10; B60W 2520/10; B60W 2510/102; B60W 2510/0241; B60W 2050/0014; B60W 2710/081; B60W 2710/0644; B60W 2710/027; B60W 2510/1015; Y10S 903/93; Y10S 903/945; B60Y 2200/92
See application file for complete search history.

(56) References Cited

U.S. PATENT DOCUMENTS 8,506,449 B2 * 8/2013 Yoshida .................. B60K 6/48
477/180
9,162,673 B2 * 10/2015 Kawamoto ........... B60W 20/30
(Continued)

*Primary Examiner* — Russell Frejd
(74) *Attorney, Agent, or Firm* — Morgan, Lewis & Bockius LLP

(57) ABSTRACT

A method for controlling gear shifting of a hybrid electric vehicle, which is configured for reducing gear-shifting time, minimizing loss by a drive system, improving fuel efficiency and enhancing drivability and which enables a driver to feel a change in acceleration when the driver manipulates the accelerator pedal during power-on upshift active control operation may include speed control of the driving source of the vehicle based on a change rate of a transmission input speed and feedforward control of the clutch of the engagement element in the transmission, to which a driver requested torque is reflected, which are performed at the same time during power-on upshift active control operation, facilitating the driver to feel a change in acceleration which is produced by his or her driving manipulation.

9 Claims, 8 Drawing Sheets

(51) Int. Cl.
*B60W 10/11* (2012.01)
*B60W 20/10* (2016.01)
*B60W 30/19* (2012.01)
*B60W 50/00* (2006.01)

(52) U.S. Cl.
CPC ............ *B60W 30/19* (2013.01); *B60W 50/00* (2013.01); *B60W 2050/0014* (2013.01); *B60W 2510/0241* (2013.01); *B60W 2510/102* (2013.01); *B60W 2510/1015* (2013.01); *B60W 2520/10* (2013.01); *B60W 2540/10* (2013.01); *B60W 2710/027* (2013.01); *B60W 2710/0644* (2013.01); *B60W 2710/081* (2013.01); *B60Y 2200/92* (2013.01); *Y10S 903/93* (2013.01); *Y10S 903/945* (2013.01)

(56) References Cited

U.S. PATENT DOCUMENTS

| | | | |
|---|---|---|---|
| 9,623,867 B2 * | 4/2017 | Ashizawa | B60W 20/19 |
| 2010/0273604 A1 * | 10/2010 | Imaseki | B60K 6/365 |
| | | | 477/5 |
| 2013/0218387 A1 * | 8/2013 | Otsubo | B60K 6/445 |
| | | | 701/22 |
| 2018/0099671 A1 * | 4/2018 | Bang | B60W 30/188 |

* cited by examiner

[FIG. 1]
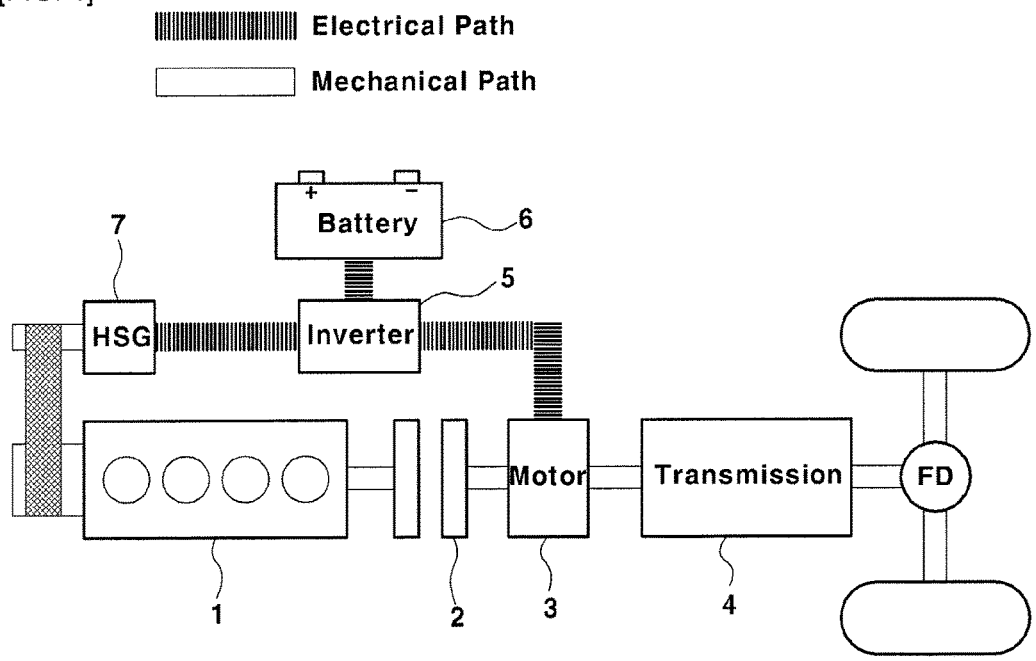
[FIG. 2]
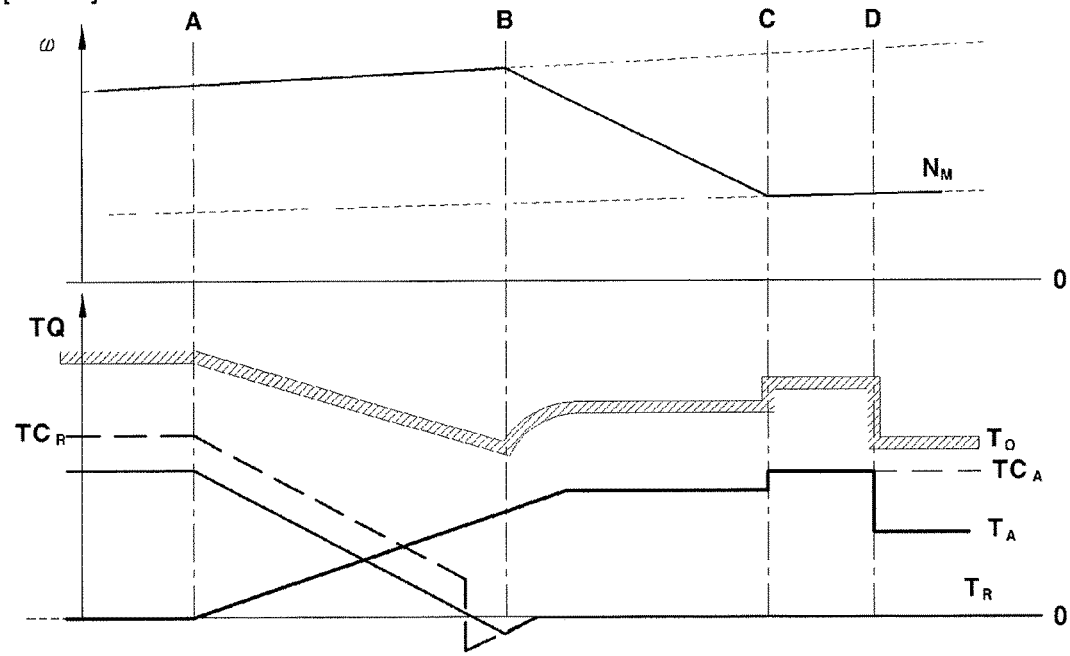

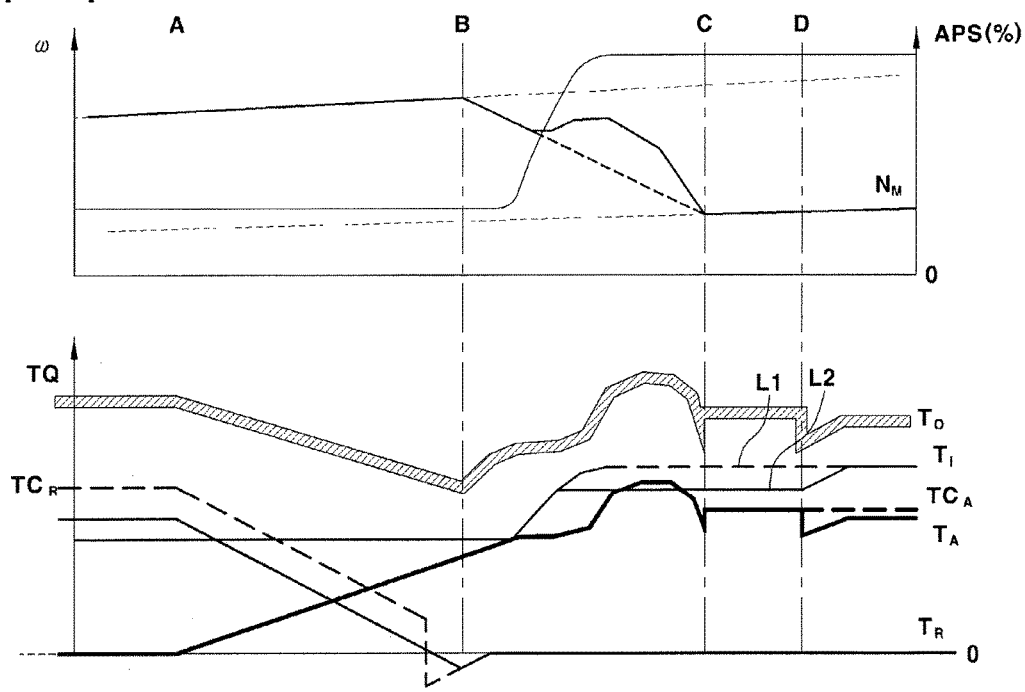

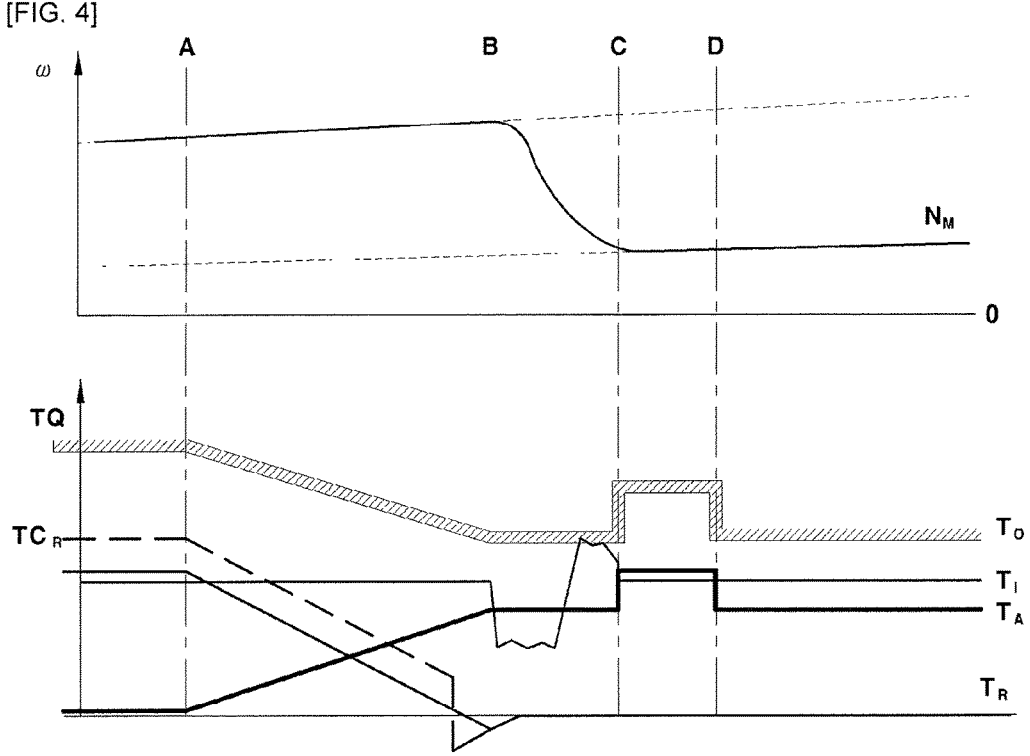

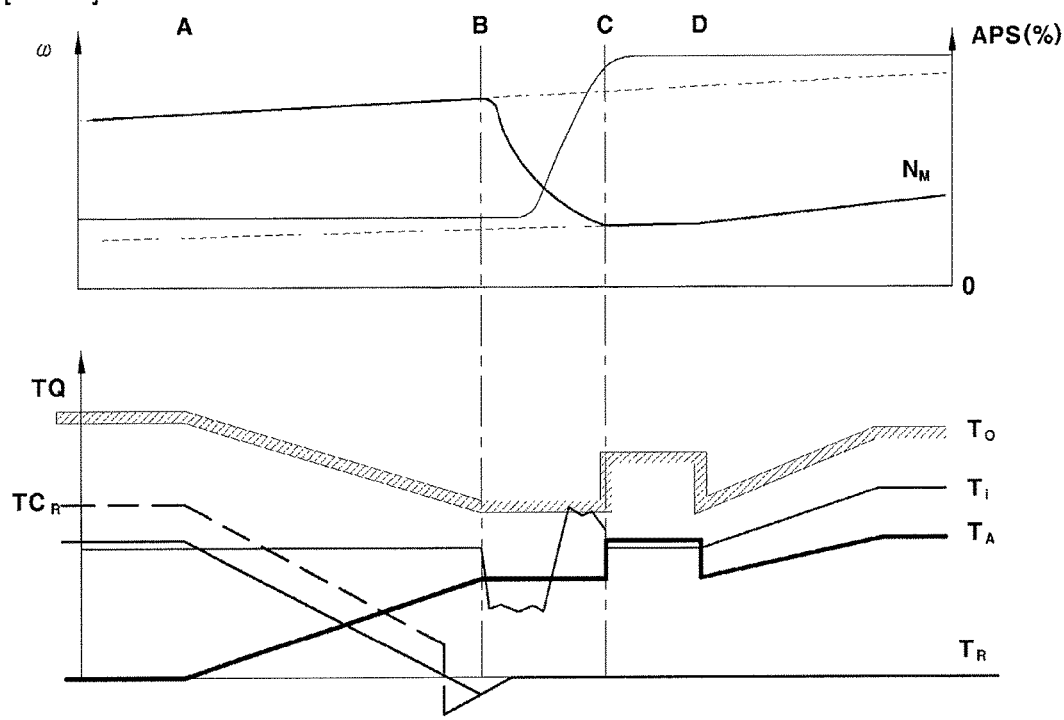
[FIG. 5]

[FIG. 6]
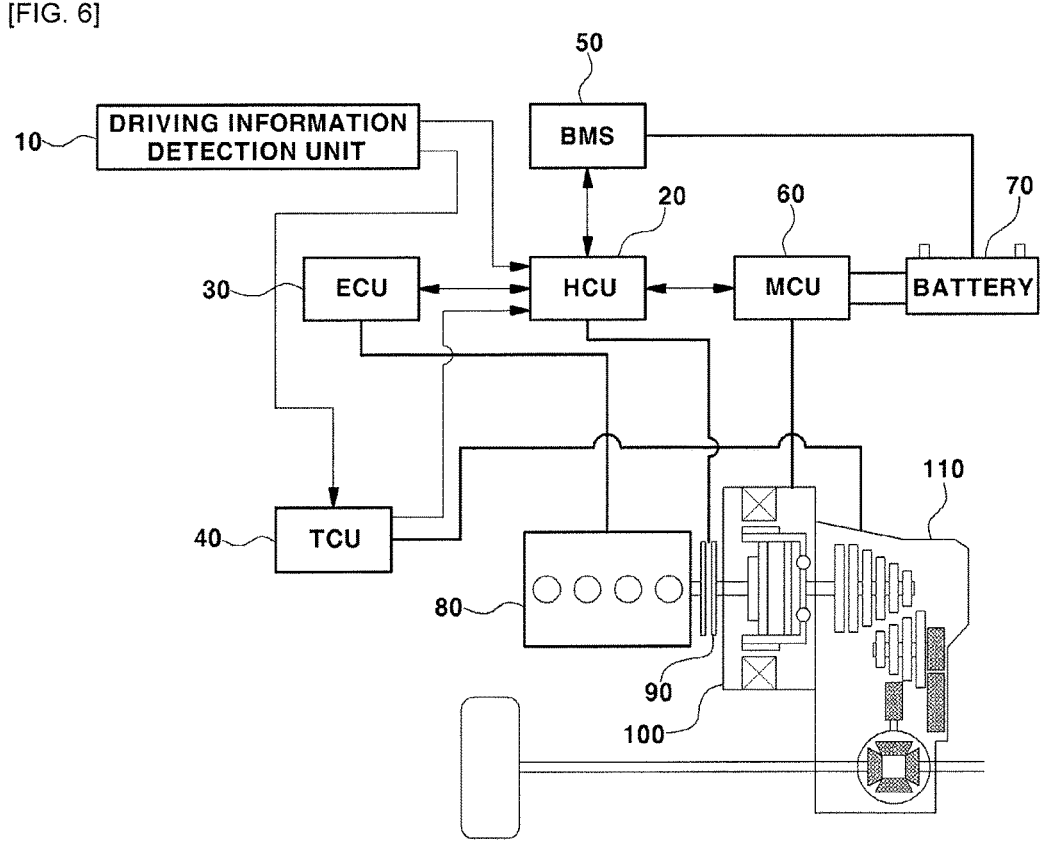

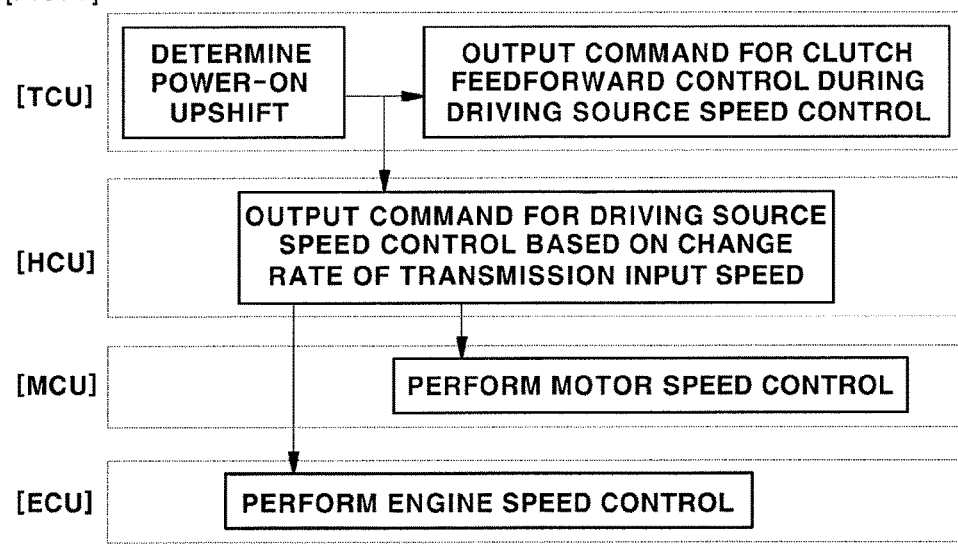
[FIG. 7]

[FIG. 8]
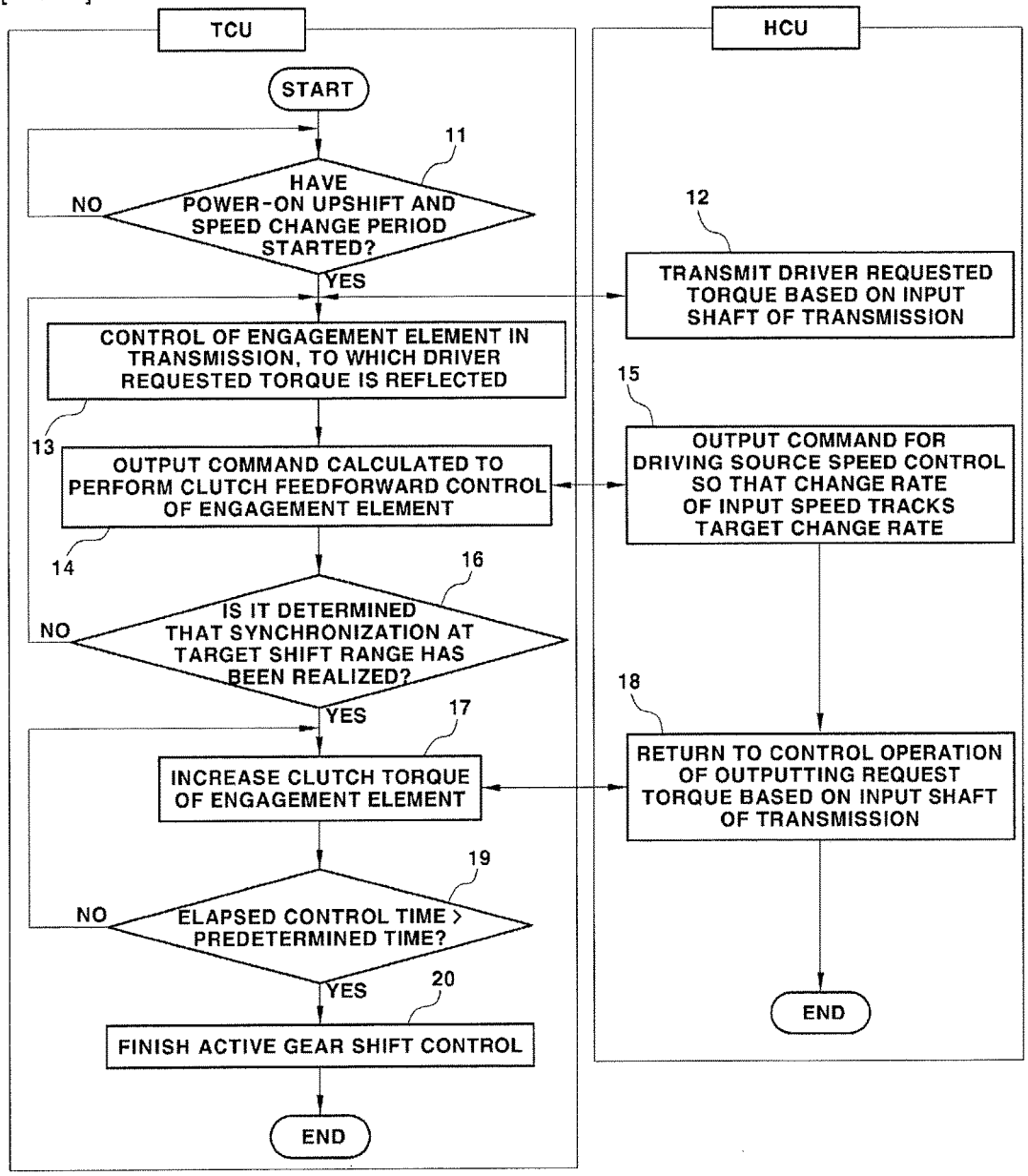

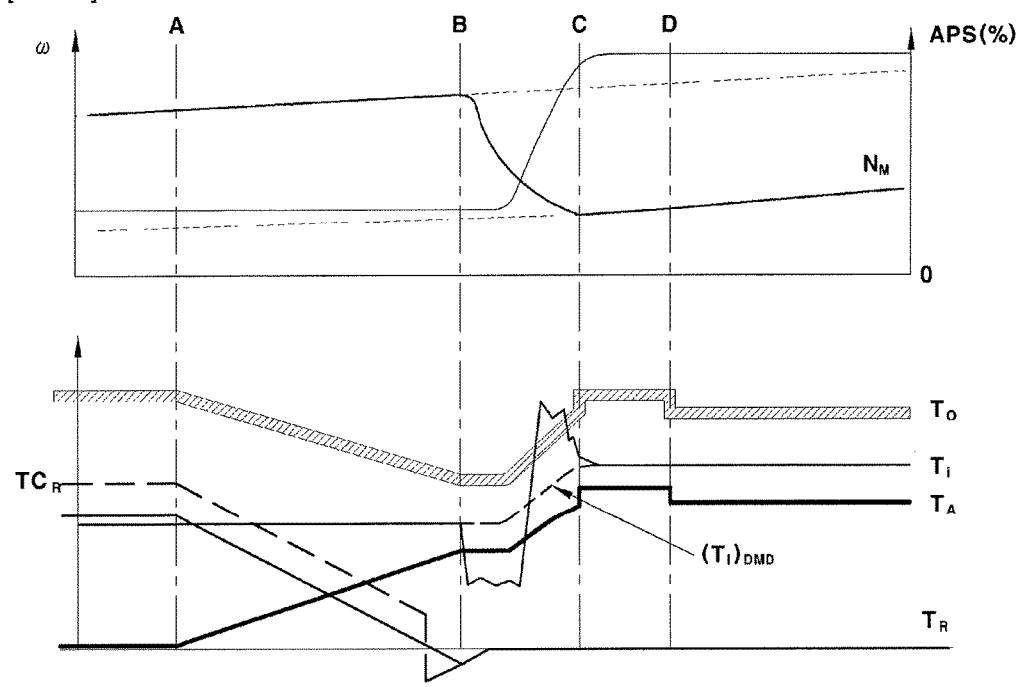
[FIG. 9]

METHOD FOR CONTROLLING GEAR SHIFTING OF HYBRID ELECTRIC VEHICLE

CROSS-REFERENCE TO RELATED APPLICATION

The present application claims priority to Korean Patent Application No. 10-2017-0123126 filed on Sep. 25, 2017, the entire contents of which is incorporated herein for all purposes by this reference.

BACKGROUND OF THE INVENTION

Field of the Invention

The present invention relates to a method for controlling gear shifting of a hybrid electric vehicle, and more particularly, a method for controlling gear shifting of a hybrid electric vehicle, which is configured for reducing gear-shifting time, minimizing loss by a drive system, improving fuel efficiency and enhancing drivability and which enables a driver to feel a change in acceleration when the driver manipulates an accelerator pedal during a power-on upshift active control operation.

Description of Related Art

Hybrid electric vehicles (HEVs) refer to vehicles that use two or more different kinds of power sources. In general, HEVs are driven by an engine, which generates driving power by combusting a fuel, and a motor, which generates driving power using the electrical energy of a battery.

FIG. 1 is a view illustrating the construction of a powertrain system for HEVs, particularly a transmission-mounted electric device (TMED)-type powertrain system, in which a driving motor 3 and a transmission 4 are directly connected to each other.

As shown in the drawing, in the TMED-type hybrid system, the transmission 4 is mounted to an output side of the driving motor 3 for vehicle traveling so that the output shaft of the motor is connected to the input shaft of the transmission, and accordingly, the speed of the motor becomes the input speed of the transmission (i.e. the rotation speed of the input shaft of the transmission).

Describing the construction in more detail, the hybrid electric vehicle may include an engine 1 and a motor 3, which are power sources for vehicle traveling, an engine clutch 2 disposed between the engine 1 and the motor 3, a transmission 4 connected to the output side of the motor 3, an inverter 5 for driving the motor 3, and a battery 6, which serves as a power source (an electric power source) for the motor 3 and is connected to the motor 3 via the inverter 5 to be charged or discharged.

Reference numeral 7 in FIG. 1 denotes a hybrid starter and generator (HSG), which is a kind of motor, connected to the engine 1 for transmitting power for starting the engine or generating electric power using rotational force transmitted from the engine.

The HSG operates as a motor or a generator, and is directly connected to the engine via a power transmission device including a belt and a pulley, such that power can be transmitted at all times, and accordingly may be used for control of the engine speed.

The engine clutch 2 transmits power or interrupts the transmission of power between the engine 1 and the motor 3 through an engagement (closing) operation or disengagement (opening) operation thereof using hydraulic pressure.

The inverter 5 converts direct current of the battery 6 into three-phase alternating current and applies the same to the motors 3 and 7 to drive the motors.

The transmission 4 transmits the power of the motor 3 or the combined power of the engine 1 and the motor 3 to driving wheels through a driveshaft while shifting gears. In hybrid electric vehicles, the transmission may be embodied as an automatic transmission (AT) or a double-clutch transmission (DCT).

The hybrid electric vehicle having the above construction may be driven in an electric-vehicle (EV) mode, which is a pure electric-vehicle mode using only the power of the motor 3, or a hybrid-electric-vehicle (HEV) mode, which utilizes the power of both the engine 1 and the motor 3.

Furthermore, when the vehicle is braking or coasting using inertia, it may be driven in a regenerative-braking mode for charging the battery (charged by the motor) by collecting the kinetic energy of the vehicle through the motor, which functions as a generator.

In the regenerative-braking mode, the motor, which receives the kinetic energy of the vehicle, generates electric power and charges the battery 6, which is connected thereto via the inverter 5.

Furthermore, the hybrid electric vehicle may include a Hybrid Control Unit (HCU), which is a high-level control device configured for controlling the overall operation of the vehicle, and various other control devices for controlling various devices of the vehicle.

For example, there may be provided an engine control unit (ECU) for controlling the operation of the engine, a motor control unit (MCU) for controlling the operation of the motor, a transmission control unit (TCU) for controlling the operation of the transmission, a battery management system (BMS) for controlling and managing the battery by detecting the state of charge of the battery to use the same for charging/discharging control of the battery or to provide the same for other control devices, and a brake control device configured for controlling the braking operation of the vehicle.

The hybrid control device and the other control devices are connected to one another via controller area network (CAN) communication to exchange information and to control the devices of the vehicle in cooperation with one another. The high-level control device collects information from the low-level control devices, and transmits control commands to the low-level control devices.

Meanwhile, in the TMED-type hybrid system, which employs an automatic transmission (AT) or a double-clutch transmission (DCT), it is possible to control the speeds of the respective driving sources, that is, to individually control the speeds of the engine and the motor, which drive the vehicle. Therefore, there is room for improvement in fuel efficiency and drivability through reduction in gear-shifting time and minimization of loss by the drive system by modifying a conventional gear shift control method or utilizing methods different from those of the related art.

If the gear-shifting time is shortened, power transmission loss may be reduced, and the load which is applied to an oil pump included in a hydraulic pressure system may be lowered, making it possible to improve the fuel efficiency of the vehicle.

Thus, there is a demand for a gear shift control technology which is configured for shortening the gear-shifting time of a hybrid electric vehicle.

According to the related art, in which active gear shift control utilizing motor speed control is performed during power-on upshift, it is difficult to enable the driver to feel the change in the acceleration when the driver manipulates the accelerator pedal while shifting gears.

Therefore, there is a demand for a gear shift control technology which is configured for transferring a change in the acceleration to the driver when the driver manipulates the accelerator pedal during power-on upshift active control operation.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling gear shifting of a hybrid electric vehicle, which is configured for reducing gear-shifting time, minimizing loss by a drive system, improving fuel efficiency and enhancing drivability and which is configured for transferring a change in acceleration to a driver when the driver manipulates an accelerator pedal during power-on upshift active control operation.

Various aspects of the present invention are directed to providing a method for controlling gear shifting of a hybrid electric vehicle, the method including starting gear shift control for power-on upshift to a target shift range, determining whether slip of a release element in a transmission has occurred after the starting the gear shift control, determining a transmission input shaft request torque value based on vehicle driving information detected by a driving information detection device in a speed change period in which a transmission input speed decreases due to occurrence of slip of the release element, determining a command value for controlling a clutch torque of an engagement element in the transmission based on the determined transmission input shaft request torque value, performing speed control of a driving source of a vehicle so that the clutch torque of the engagement element is controlled in accordance with the determined command value in the speed change period and simultaneously a change rate of the transmission input speed tracks a target change rate, and upon determining that synchronization has been realized between the transmission input speed and a predetermined synchronous speed of the target shift range by the speed control, stopping the speed control and increasing the clutch torque of the engagement element.

Other aspects and exemplary embodiments of the invention are discussed infra.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

BRIEF DESCRIPTION OF THE DRAWINGS

FIG. 1 is a view schematically illustrating the construction of a powertrain system for a TMED-type hybrid electric vehicle;

FIG. 2 is a view illustrating an example of a conventional power-on upshift control method for a TMED-type hybrid electric vehicle provided with an automatic transmission;

FIG. 3 is a view illustrating an example of a conventional control method when the accelerator pedal is manipulated during power-on upshift in a TMED-type hybrid electric vehicle provided with an automatic transmission;

FIG. 4 is a view illustrating an example of a power-on upshift active control method for a TMED-type hybrid electric vehicle provided with an automatic transmission;

FIG. 5 is a view for explaining a problem associated with a conventional control method when the accelerator pedal is manipulated during power-on upshift active control operation;

FIG. 6 is a view illustrating the construction of a system for a TMED-type hybrid electric vehicle, to which a gear shift control method according to an exemplary embodiment of the present invention is applied;

FIG. 7 is a diagram showing the main functions of respective control devices in the vehicle of the present invention;

FIG. 8 is a flowchart showing the gear shift control method for a hybrid electric vehicle according to the exemplary embodiment of the present invention; and FIG. 9 is a view illustrating an example of power-on upshift control operation for a hybrid electric vehicle according to the exemplary embodiment of the present invention.

It may be understood that the appended drawings are not necessarily to scale, presenting a somewhat simplified representation of various exemplary features illustrative of the basic principles of the invention. The specific design features of the present invention as included herein, including, for example, specific dimensions, orientations, locations, and shapes, will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the entire specification, when an element is referred to as "including" another element, the element may not be understood as excluding other elements, as long as there is no special conflicting description, and the element may include at least one other element.

Various aspects of the present invention are directed to providing a method for controlling gear shifting of a hybrid electric vehicle, which is configured for reducing gear-shifting time, minimizing loss by a drive system, improving fuel efficiency and enhancing drivability and which enables a driver to feel a change in acceleration when the driver manipulates an accelerator pedal during power-on upshift active control operation.

To the present end, various aspects of the present invention are directed to providing a power-on upshift active control method for a hybrid electric vehicle, in which speed control of a driving source of a vehicle based on a change rate of a transmission input speed and feedforward control of a clutch of an engagement element in a transmission, to which a driver requested torque is reflected, are performed at the same time during power-on upshift active control operation, facilitating a driver to feel a change in acceleration which is produced by his or her driving manipulation.

Herein, the term "power-on upshift" refers to upshift in which a transmission input speed is decreased in consideration of the optimum operating point of a driving source. The present invention is applicable to a gear shift control process which is performed when there is demand for the power-on upshift.

The gear shift control process set forth below is applicable regardless of the driving mode of a hybrid electric vehicle and the kind of transmission mounted to the vehicle.

That is, the gear shift control process set forth below is applicable to both an EV driving mode and an HEV driving mode of a hybrid electric vehicle, and is also applicable to both a hybrid electric vehicle provided with an automatic transmission (AT) and a hybrid electric vehicle provided with a double-clutch transmission (DCT).

Furthermore, the gear shift control process of the present invention is applicable to a TMED-type hybrid electric vehicle, in which a transmission (refer to reference numeral 4 in FIG. 2 and reference numeral 110 in FIG. 6) is mounted to an output side of a driving motor (refer to reference numeral 3 in FIG. 2 and reference numeral 100 in FIG. 6) for driving the vehicle and the output shaft of the motor is connected to the input shaft of the transmission. Therefore, a motor speed becomes a transmission input speed (i.e. the rotation speed of the input shaft of the transmission).

That is, in a TMED-type hybrid electric vehicle, to which the present invention is applied, when the motor operates or when both the motor and the engine operate, a motor speed, which is a rotation speed of the output shaft of the motor, is equal to a transmission input speed, which is a rotation speed of the input shaft of the transmission.

Furthermore, the gear shift control process of the present invention may be performed by cooperation of a plurality of control units including a Hybrid Control Unit (HCU), a transmission control unit (TCU), a Motor Control Unit (MCU) and an engine control unit (ECU), or may be performed by a single control device which is configured to achieve all functions of the aforementioned control devices.

A conventional gear shift control method in power-on upshift of a hybrid electric vehicle will first be explained for better understanding of the invention.

FIG. 2 is a view showing an example of a conventional power-on upshift control method for a TMED-type hybrid electric vehicle provided with an automatic transmission, wherein the vertical axis indicates a rotation speed co and a torque TQ, and the horizontal axis indicates time.

The definitions of the reference symbols shown in FIG. 2 are as follows. The following reference symbol definitions also apply to the other accompanying drawings.

$N_M$: motor speed $T_A$: transfer torque of engagement element in transmission $T_R$: transfer torque of release element in transmission $TC_A$: clutch torque of engagement element in transmission $TC_R$: clutch torque of release element in transmission $T_i$: transmission input torque (i.e. torque of input shaft of transmission)

$T_o$: transmission output torque (i.e. torque of output shaft of transmission)

In the TMED-type hybrid electric vehicle, since the motor speed $N_M$ is equal to the transmission input speed $N_i$ (i.e. the rotation speed of the input shaft of the transmission) ($N_M=N_i$), the reference symbol $N_M$ represents a transmission input speed in the accompanying drawings.

FIG. 2 illustrates the power-on upshift operation, in which the transmission input speed is reduced in consideration of the optimum operating point of the driving source.

In FIG. 2, "A" denotes the time point at which the gear shift control is started. The transmission control unit (TCU) determines whether the conditions under which the gear shift control can be started are satisfied based on the current driving information related to the vehicle. If the conditions under which the gear shift control can be started are satisfied at the time point A, the gear shift control for the power-on upshift is started.

The TCU detects power-on upshift demand based on the current driving information related to the vehicle. That is, the TCU determines whether the gear shift control for the power-on upshift needs to be started in accordance with a shift pattern based on the driving information related to the vehicle.

For example, as one of the conditions for allowing the start of the gear shift control, if the current speed of the vehicle, which is one of the pieces of driving information related to the vehicle, is greater than a predetermined reference value at the time point A, it is determined that power-on upshift demand has been generated, and the gear shift control for the power-on upshift is started.

As described above, if the power-on upshift is determined in accordance with the shift pattern and the gear shift control is started at the time point an in FIG. 2, the TCU decreases the clutch torque $TC_R$ of the release element in the transmission and increases the clutch torque $TC_A$ ($TC_A=T_A$) of the engagement element in the transmission, releasing the clutch.

Ideally, when the transfer torque $T_R$ of the release element is equal to or less than 0 ($T_R \leq 0$), slip occurs.

As is seen from FIG. 2, the clutch torque $TC_A$ of the engagement element has the same value as the transfer torque $T_A$ of the engagement element before the time point D or at least from the start of the gear shift control at the time point A to the time point C via the time point B.

A speed change period is started at the time point B, which is the time point at which a decrease in the transmission input speed (i.e. the rotation speed of the input shaft of the transmission) $N_i$ ($N_i=N_M$) is detected due to the clutch slip of the release element in the transmission.

At the present time, since the vehicle is a TMED-type hybrid electric vehicle, the transmission input speed $N_i$ is equal to the motor speed $N_M$ ($N_i=N_M$).

Accordingly, upon detecting the decrease in the transmission input speed ($N_i = N_M$), the control device determines that the condition for entering the speed change period is satisfied. Upon detecting the decrease in the transmission input speed $N_M$ at the time point B, the control device sets a target change rate of the transmission input speed (i.e. the rotation speed of the input shaft of the transmission) at the time point B, and feedback-controls the clutch torque $TC_A$ of the engagement element so that the change rate of the transmission input speed $N_M$ (i.e. the change rate of the motor speed) tracks the target change rate starting at the time point B.

At the present time, a relationship of $T_o = \gamma(TC_A)$ is generated between the clutch torque $TC_A$ of the engagement element in the transmission and the transmission output torque (i.e. the torque of the output shaft of the transmission) $T_o$. Here, $\gamma$ is a constant value, which is determined by a gear ratio.

When the transmission input torque (i.e. the torque of the input shaft of the transmission) $T_i$ is large, the transmission input speed (i.e. the rotation speed of the input shaft of the transmission) is not changed rapidly. Therefore, control for decreasing the transmission input torque may be performed to rapidly achieve the control with a small clutch torque and to reduce variation in torque at the final process of the gear shift through control with a small clutch torque.

The time point C is the time point at which the synchronization is completed and a synchronized period is started. For example, if it is determined at the time point C that the condition "|transmission input speed $N_i$–synchronous speed |<reference value" has been continuously satisfied for a predetermined time period, the TCU determines that the synchronization has been realized, and enters the synchronized period, in which the TCU increases the clutch torque $TC_A$ of the engagement element and finishes the gear shift.

Here, the synchronous speed may be a predetermined speed which is set in the TCU in accordance with a target shift range.

The time point D is the time point at which the gear shift is completed. As indicated by the time point D, when the clutch torque $TC_A$ of the engagement element has a maximum value MAX and the clutch torque $TC_R$ of the release element becomes 0, or when a predetermined time period has elapsed since the time point C, the TCU determines that the gear shift has been completed.

At the time point D, at which the gear shift has been completed, the TCU completely finishes controlling the clutch of the transmission.

Hereinafter, a conventional method of controlling gear shift when a driver manipulates the accelerator pedal (tip-in/tip-out) during the power-on upshift operation will be described.

FIG. 3 is a view showing an example of the power-on upshift control for a TMED-type hybrid electric vehicle provided with an automatic transmission, showing an example of control in a tip-in event within the actual gear shift period (the period between B and C), wherein the vertical axis indicates a rotation speed ω, a value (%) of an accelerator position sensor (APS) and a torque TQ, and the horizontal axis indicates time.

FIG. 3 illustrates an example in which a driver has an intention to accelerate the vehicle during the power-on upshift operation, in which the transmission input speed is reduced in consideration of an optimum operating point of the driving source, that is, an example in which a driver manipulates the accelerator pedal and a requested torque is generated.

Describing the situation in which the accelerator pedal is manipulated between the time point A and the time point B, that is, in which the tip-in event occurs in the period between A and B, the value of the clutch torque TC at the time point A is proportional to the transmission input torque $T_i$ by the torque share ratio, and the clutch torque is increased or decreased from the above value until the time point B as long as there is no change in the torque. Therefore, as torque command values, the clutch torque $TC_A$ of the engagement element (which has the same value as the transfer torque $T_A$ of the engagement element in the period between A and B) and the clutch torque $TC_R$ of the release element are determined in a form of $(TC)_{BASE} + dTC \times t_{elapsed}$.

Here, $(TC)_{BASE}$ may indicate a torque TQ or a value determined by multiplying the same by a certain factor. In the case of a hydraulic pressure system, to reduce a response delay, the torque TQ may be replaced by an APS value. The inclination component dTC may be constituted by a plurality of terms.

$(TC)_{BASE}$ denotes a base torque, which is determined based on the driving information related to the vehicle (e.g., the transmission input speed or the transmission input torque), $t_{elapsed}$ denotes an elapsed time period from the time point A to the current time point at which the control is being performed, and dTC denotes a change inclination of the clutch torque TC.

At the present time, even though the driver manipulates the accelerator pedal in the period between the time point A and the time point B, $(TC)_{BASE}$ is changed in proportion to the increase in the transmission input torque $T_i$. Therefore, the value of the clutch torque $TC_A$ of the engagement element and the value of the clutch torque $TC_R$ of the release element are balanced, and accordingly the gear-shifting sensation is not greatly deteriorated.

Meanwhile, when the accelerator pedal is manipulated in the period between the time point B and the time point C, as shown in FIG. 3, when the tip-in event occurs in the period between B and C, speed control is performed with respect to the driving source (the motor or both the engine and the motor) of the vehicle so that the transmission input speed (i.e. the rotation speed of the input shaft of the transmission or the motor speed) $N_M$ tracks the target change rate in the period between B and C.

At the same time, the clutch torque $TC_A$ of the engagement element (which has the same value as the transfer torque $T_A$ of the engagement element in the period between B and C) is feedback-controlled. At the present time, because PID control is performed while the torque at the time point B is fixed as a start value, as shown in FIG. 3, if the transmission input speed $N_M$ is changed in accordance with the change in the transmission input torque $T_i$, the clutch torque $TC_A$ of the engagement element and the transmission output torque (i.e. the torque of the output shaft of the transmission) $T_O$ are also changed, whereby the driver may feel the change in the acceleration as if the gear shift were not performed.

Furthermore, to prevent noise and a great change in the acceleration of the vehicle due to the excessive change in the transmission input speed $N_M$, control may be performed to reduce the transmission input torque $T_i$ by a predetermined value ($T_i$ is reduced from the value indicated by the dotted line L1 to the value indicated by the solid line L2 in FIG. 3).

Hereinafter, a conventional method for actively controlling the power-on upshift will be described.

FIG. 4 is a view showing an example of a power-on upshift active control method for a TMED-type hybrid electric vehicle provided with an automatic transmission, wherein the vertical axis indicates a rotation speed w and a torque TQ, and the horizontal axis indicates time.

While the power-on upshift active control is performed, the gear-shifting time is shortened by controlling the speed of the driving source in the speed change period.

In FIG. 4, the time point A is the time point at which gear shift control is started. The TCU determines whether the conditions for starting the gear shift control are satisfied based on the current driving information related to the vehicle. Upon determining that the conditions for starting the gear shift control are satisfied at the time point A, the TCU starts the gear shift control.

Accordingly, the process of starting the gear shift control when the conditions for starting the gear shift control are satisfied at the time point A is the same as or substantially the same as the control process shown in FIG. 2 and FIG. 3. A speed change period is started at the time point B, at which a decrease in the transmission input speed $N_M$ is detected after the gear shift control was started.

The conditions for entering the speed change period may also be set in the same manner as that in the control process shown in FIG. 2 and FIG. 3.

If the speed change period is started at the time point B, the TCU performs feedforward control to minimize the control of the clutch in the transmission to avoid affecting the control of the transmission input speed.

At the present time, the control device, for example, the transmission control unit (TCU), minimizes the clutch control by maintaining a clutch torque command constant or using a clutch torque command indicating a constant inclination.

Furthermore, the control device, for example, the hybrid control unit (HCU) performs speed control of the driving sources (i.e. the engine and the motor) of the vehicle so that the change rate of the transmission input speed tracks the target change rate from the time point B.

The time point C is the time point at which the synchronization is completed and a synchronized period is started. Upon determining that the synchronization has been completed, the TCU finishes the gear shift by increasing the clutch torque $TC_A$ of the engagement element.

Furthermore, the torque value including the transmission output torque (i.e. the torque of the output shaft of the transmission) $T_O$, is set to the value of the driver requested torque by the hybrid control unit (HCU).

The time point D is the time point at which the gear shift has been completed. The TCU completely finishes controlling the clutch of the transmission at the time point D, at which the gear shift has been completed.

The determination of the completion of the synchronization and the control process performed after the start of the synchronized period at the time point C in FIG. 4 have no difference from those in FIG. 2 and FIG. 3. The processes of determining the completion of the gear shift and finishing controlling the clutch of the transmission at the time point D are also the same as or substantially the same as those in FIG. 2 and FIG. 3.

Hereinafter, a problem associated with a conventional gear shift control method that occurs when a driver manipulates the accelerator pedal (tip-in/tip-out) while shifting gears will be described with reference to FIG. 5.

FIG. 5 is a view for explaining a problem associated with a conventional gear shift control method that occurs when a driver manipulates the accelerator pedal while shifting gears, that is, a view for explaining a problem that occurs when a driver manipulates the accelerator pedal while the power-on upshift active control is performed as shown in FIG. 4, wherein the vertical axis indicates a rotation speed co, a value (%) of an accelerator position sensor (APS) and a torque TQ, and the horizontal axis indicates time.

If the tip-in or tip-out event occurs in the period between the time point B and the time point C, the active gear shift control is performed in the manner of controlling the transmission input torque while minimizing the clutch control. Thus, the acceleration of the vehicle, which is influenced by the clutch torque, is not changed, and accordingly the driver cannot feel any change despite manipulating the accelerator pedal.

Furthermore, because it is not possible to increase the transmission input torque to satisfy the conditions for synchronization in the period between the time point C and the time point D, the control process is delayed until the synchronization is finally completed.

Furthermore, like the related art, if feedback control is performed in the period between the time point B and the time point C, the feedback control and the speed control of the driving source interfere with each other, whereby control stability may be deteriorated and the acceleration of the vehicle of a desired level may not be produced.

As described above, according to the related art, in which the active gear shift control is performed to obtain the effects of improving fuel efficiency and drivability through shortening the gear-shifting time during the power-on upshift operation, even though the accelerator pedal is manipulated during the control operation, the acceleration of the vehicle is not changed. As a result, there is a problem in that a driver cannot feel the change in acceleration of the vehicle despite manipulating the accelerator pedal.

Furthermore, according to the related art, because the gear-shifting time is shortened by the active gear shift control, a request torque may be realized in a short time after the gear shift is completed. However, it is still disadvantageous in terms of responsiveness.

Referring to FIG. 5, even though the driver manipulates the accelerator pedal in the period between B and C, the transmission output torque $T_O$ and the transfer torque (a fixed value is used) of the engagement element in the transmission have constant values without any changes. The present indicates that the acceleration of the vehicle is not changed despite the driver's manipulation of the accelerator pedal.

To solve the above problems, the present invention is characterized in that speed control of a driving source of a vehicle based on a change rate of a transmission input speed and feedforward control of a clutch of an engagement element in a transmission, to which a driver requested torque is reflected, are performed at the same time during power-on upshift active control operation, facilitating a driver to feel the change in acceleration which is produced by his or her driving manipulation.

According to an exemplary embodiment of the present invention, when a driver manipulates the accelerator pedal in the speed change period after the time point B, the speed control of the driving source of the vehicle based on the transmission input speed and the feedforward control of the clutch of the engagement element, to which a driver requested torque is reflected, are performed, producing the change in acceleration of the vehicle.

Hereinafter, a method for controlling power-on upshift for a hybrid electric vehicle according to the exemplary embodiment of the present invention will be described more specifically with reference to FIG. 6, FIG. 7, FIG. 8, and FIG. 9.

FIG. 6 is a view illustrating the construction of a system for a TMED-type hybrid electric vehicle, to which the gear shift control method according to an exemplary embodiment of the present invention is applied. The hybrid electric vehicle may include an engine 80 and a motor, which serve as driving sources for driving the vehicle, an engine clutch 90 disposed between the engine 80 and the motor 100, a transmission 110 connected to an output side of the motor 100, a motor control unit (MCU) 60, which may include an inverter for driving and controlling the motor 100, and a battery 70, which is configured as a power source (an electric power source) for the motor 100 and is connected to the motor 100 via the inverter in the motor control unit 60 so to be charged or discharged.

Reference numeral 10 in FIG. 6 denotes a driving information detection device, which may include an accelerator position sensor (APS) and a vehicle speed detector. The driving information detection device 10 may be connected to a hybrid control unit (HCU) 20 or a transmission control unit (TCU) 40, which is a highest-level control unit, to input detected values to the same.

The vehicle driving information may further include information which is used as variables in a control process, which will be described later, for example, a transmission input speed (which is a rotation speed of the input shaft of the transmission and which is equal to a motor speed, $N_i=N_M$), a transmission input torque (i.e. a torque of the input shaft of the transmission) $T_i$, etc.

The information, which is used as variables in the control process, which will be described later, may be acquired by detection elements including sensors. Therefore, the aforementioned driving information detection device 10 may include detection elements including sensors.

The engine clutch 90 transmits power or interrupts the transmission of power between the engine 80 and the motor 100 through an engagement (closing) operation or disengagement (opening) operation thereof using hydraulic pressure. The inverter in the motor control device 60 converts direct current of the battery 70 into three-phase alternating current and applies the same to the motor 100 to drive the same.

The transmission 110 transmits the power of the motor 100 or the combined power of the engine 80 and the motor 100 to driving wheels through a driveshaft while shifting gears. The transmission may be embodied as an automatic transmission (AT) or a double-clutch transmission (DCT).

Furthermore, the hybrid electric vehicle may include a hybrid control unit (HCU) 20, which is a high-level control unit for controlling the overall operation of the vehicle, and various other control devices for controlling various devices of the vehicle.

For example, there are provided an engine control unit (ECU) 30 for controlling the operation of the engine, a motor control unit (MCU) 60 for controlling the operation of the motor 100, a transmission control unit (TCU) 40 for controlling the operation of the transmission 110, and a battery management system (BMS) 50 for controlling and managing the battery 70 by detecting the state of charge of the battery 70 to use the same for charging/discharging control of the battery or to provide the same to other control devices.

The hybrid control device and the other control devices are connected to one another via controller area network (CAN) communication to exchange information and to control the devices of the vehicle in cooperation with one another. The high-level control device collects information from the low-level control devices, and transmits control commands to the low-level control devices.

FIG. 7 is a diagram showing the main functions of the respective control devices in the vehicle of the present invention. Describing the control devices in more detail, the transmission control unit (TCU) 40 determines whether power-on upshift demand has been generated based on the driving information related to the vehicle detected by the driving information detection device 10.

Upon detecting the power-on upshift demand based on the driving information related to the vehicle, that is, upon determining that the power-on upshift demand has been generated, the TCU 40 performs feedforward control of the clutch of the transmission while speed control of the driving source of the vehicle is performed during the gear shift operation.

During the power-on upshift operation, the hybrid control unit (HCU) 20 performs speed control of the driving source of the vehicle in cooperation with the motor control unit (MCU) 60 and the engine control unit (ECU) 30. At the present time, the HCU 20 outputs a torque command for controlling the speed of the driving source of the vehicle based on a change rate of the transmission input speed.

The motor control unit (MCU) 60 drives the motor 100 in accordance with a motor torque command, which is output from the HCU 20, and controls the motor speed (control of operation of the motor according to a command). The engine control unit (ECU) 30 drives the engine 80 in accordance with an engine torque command, which is output from the HCU 20, and controls the engine speed (control of operation of the engine according to a command).

Hereinafter, a gear shift control method according to an exemplary embodiment of the present invention will be described more specifically with reference to the drawings.

FIG. 8 is a flowchart showing the gear shift control method for a hybrid electric vehicle according to the exemplary embodiment of the present invention, and FIG. 9 is a view showing an example of power-on upshift control operation for a hybrid electric vehicle according to the exemplary embodiment of the present invention.

FIG. 9 is a view, which corresponds to FIG. 5 and which illustrates a control process which is performed when a driver manipulates the accelerator pedal while the power-on upshift active control is performed, that is, a control process which is performed when a tip-in event occurs while the power-on upshift active control is performed, wherein the vertical axis indicates a rotation speed co, a value (%) of an accelerator position sensor (APS) and a torque TQ, and the horizontal axis indicates time.

FIG. 9 shows an example in which the gear shift control for the power-on upshift was started at the time point A and a tip-in event occurs such that a driver steps on the accelerator pedal in the speed change period after the time point B.

First, the TCU 40 detects a power-on upshift demand based on the current driving information related to the vehicle detected by the driving information detection device 10, which is not distinguished from that of the above-described related art.

That is, a time point an in FIG. 9 is a time point at which gear shift control for power-on upshift to a target shift range is started. The TCU may be configured to determine whether conditions for entering the gear shift control are satisfied, for example, whether the current vehicle speed, which is detected by the vehicle speed detector included in the driving information detection device 10, is greater than a predetermined reference value in the target shift range.

If the above-described condition for entering the gear shift control is satisfied, that is, if the current vehicle speed is greater than the predetermined reference value, the TCU determines that a power-on upshift demand has been generated, and enters a gear shift control mode for power-on upshift at the time point A, at which the above-described condition is satisfied, whereby the TCU starts the gear shift control process.

In other words, if the current vehicle speed is greater than the reference value, it is determined that a power-on upshift demand has been generated in accordance with a shift pattern, and the gear shift control for power-on upshift is started.

As described above, if the power-on upshift demand has been generated in accordance with the shift pattern and the gear shift control is started at the time point an in FIG. 9, the TCU decreases the clutch torque $TC_R$ of the release element in the transmission and increases the clutch torque $TC_A$ ($TC_A=T_A$) of the engagement element in the transmission, releasing the clutch.

The clutch torque $TC_A$ of the engagement element has the same value as the transfer torque $T_A$ of the engagement element at least from the start of the gear shift control at the time point A to the time point D via the time points B and C. As shown in FIG. 9, from the time point A, at which the gear shift control is started, to the time point B, the clutch torque $TC_A$ of the engagement element and the transfer torque $T_A$ of the engagement element gradually increase, whereas the clutch torque $TC_R$ of the release element and the transfer torque $T_R$ of the release element gradually decrease.

Ideally, when the transfer torque $T_R$ of the release element becomes equal to or less than 0 ($T_R \leq 0$) after the time point A and before the time point B, slip occurs. The clutch torque $TC_R$ and the transfer torque $T_R$ of the release element are maintained at 0 in a speed change period, which is started at the time point B, and subsequent periods, which will be described later.

Furthermore, from the time point A to the time point B, at which the speed change period is started (the time point at which whether slip of the release element has occurred is determined), the transmission input torque (i.e. the torque of the input shaft of the transmission) $T_i$ may be maintained constant. At the present time, the transmission output torque (i.e. the torque of the output shaft of the transmission) $T_O$ gradually decreases.

The above-described control process from the time point A, at which the gear shift control for power-on upshift is started, to the time point B, at which the speed change period is started, that is, the control process in the period between A and B, is not distinguished from the control process shown in FIGS. 2 to 5.

That is, at least until the time point B, the clutch torque $TC_A$ of the engagement element, the clutch torque $TC_R$ of the release element, the transmission output torque $T_O$, the transmission input torque $T_i$, the transfer torque $T_R$ of the release element, and the transfer torque $T_A$ of the engagement element are not distinguished from those in the control process shown in FIGS. 2 to 5.

Although the illustration of the clutch torque $TC_A$ of the engagement element is omitted from FIG. 9, the clutch torque $TC_A$ of the engagement element has the same value as the transfer torque $T_A$ of the engagement element at least until the time point D, at which the gear shift is completely finished.

According to an exemplary embodiment of the present invention, in the period between A and B, that is, after the start of the gear shift control and before the start of the speed change period, the control device, for example, the transmission control unit (TCU) 40, increases the clutch torque of the engagement element in the transmission (which equals the transfer torque $T_A$) and decreases the clutch torque ($TC_R$) of the release element. At the present time, a torque command value for clutch control of the engagement element and the release element may be determined in a form of $(TC)_{BASE}+dTC \times t_{elapsed}$, like the related art, described above with reference to FIG. 3.

Here, $(TC)_{BASE}$ denotes a base torque command value, which is determined based on the driving information related to the vehicle, for example, the transmission input speed $N_M$ and the transmission input torque $T_i$, $t_{elapsed}$ denotes an elapsed time period from the time point A to the current time point, at which the control is being performed, and dTC denotes a change inclination of the clutch torque TC of the engagement element or a change inclination of the clutch torque TC of the release element in the period between A and B.

A torque command value $TC_{A-B}*$ of the release element and the engagement element in the period between A and B may be determined from the following equation 1, to which a torque command correction value $(TC)_{COR}$ is added.

$$TC_{A-B}* = (TC)_{BASE} + (TC)_{COR} + dTC \times t_{elapsed} \qquad \text{Eq. 1}$$

The TCU 40 may determine the base torque command value $(TC)_{BASE}$ using a map based on the current transmission input speed $N_M$ and the current transmission input torque $T_i$.

The torque command correction value $(TC)_{COR}$ may include a learning correction value, which is obtained from a predetermined learning process, or a temperature correction value, which is obtained from a predetermined temperature correction logic. The torque command correction value $(TC)_{COR}$ may be the sum of various correction values including the learning correction value, the temperature correction value and the like.

Here, the above temperature may be a value that represents the temperature characteristics of the clutch of the transmission, for example, the temperature of the clutch of the transmission which is detected by a detector.

When the clutch in the transmission is engaged, the friction characteristics are changed according to the temperature of the friction surfaces of the clutch. Thus, to realize the target transfer torque, the temperature of the friction surfaces needs to be corrected based on the reference temperature, for example, an ordinary temperature. Here, the portion at which the temperature is measured may vary depending on the transmission system.

If it is impossible to measure the temperature of each portion of the clutch, a measured temperature value of a certain portion may be used as the aforementioned temperature. If it is impossible to detect the temperature of a desired portion using a detector due to insufficient sensor-mounting space, a temperature which is obtained through modeling using an ambient temperature may be used as the aforementioned temperature. In the case of a wet clutch system, the temperature of the transmission oil may be used as the aforementioned temperature.

As described above, when the TCU 40 determines and outputs a torque command, the operation of an actuator for performing clutch control of the engagement element and the release element is controlled in accordance with the torque command output from the TCU.

Here, the actuator may be a valve for controlling hydraulic pressure in an automatic transmission (AT) or a well-known actuator for controlling a clutch in a double-clutch transmission (DCT).

After the gear shift control for power-on upshift is started, it is determined that slip of the release element has occurred, and the speed change period is started at the time point B. The time point B is the time point at which it is determined that slip of the release element has occurred and a decrease in the transmission input speed (i.e. the rotation speed of the input shaft of the transmission) $N_i$ due to the slip of the release element is detected. Here, since the vehicle is a TMED-type hybrid electric vehicle, the transmission input speed $N_i$ is equal to the motor speed $N_M$ ($N_i=N_M$).

The control device is programmed such that it determines that the condition for entering the speed change period is satisfied when a decrease in the transmission input speed $N_i$ ($N_i=N_M$) is detected. Upon detecting a decrease in the transmission input speed $N_i$ at the time point B, the control device determines that slip of the release element has occurred, and starts control of the speed change period.

In the speed change period, to realize the power-on upshift, the transmission input speed $N_i$ ($N_i=N_M$) is decreased before the synchronized period is started at the time point C.

Referring to the APS value (%) in the example shown in FIG. 9, during the power-on upshift operation, the APS value increases and is then maintained constant between the time point B and the time point C.

This indicates that the driver steps on the accelerator pedal after the time point B and keeps stepping on the accelerator pedal.

That is, in the example shown in FIG. 9, after the power-on upshift control was started at the time point A, the driver tips in the accelerator pedal and keeps stepping on the accelerator pedal in the speed change period after the time point B.

If the speed change period is started at the time point B after the power-on upshift control was started at the time point A (i.e. if the condition of step S11 in FIG. 8 is satisfied), the control device determines a torque command for feedforward-controlling the clutch of the engagement element (i.e. a transfer torque command of the engagement element or a clutch torque command of the engagement element) (S13).

Describing the present process in more detail, the HCU 20 determines a transmission input shaft request torque value $(T_i)_{DMD}$, to which a Driver's Intention is reflected, based on the vehicle driving information detected by the driving information detection device 10, and transmits the determined transmission input shaft request torque value $(T_i)_{DMD}$ to the TCU 40 (S12).

The driving information detection device 10 may include an accelerator position detector. The HCU 20 may be programmed such that it determines a transmission input shaft request torque value $(T_i)_{DMD}$, to which a driver's intention is reflected, based on the information related to the manipulated state of the accelerator pedal (i.e. an APS value), which is detected by the accelerator position detector.

In a process of controlling a common hybrid electric vehicle, a driver requested torque which is generated by a driver's driving manipulation (e.g., manipulation of the accelerator pedal), that is, a request torque, to which a driver's intention is reflected, is determined. The present driver requested torque is a torque which is required for driving the vehicle.

The driver requested torque refers to a transmission input shaft request torque which is generated by the driving source of the vehicle, that is, the motor in the EV driving mode or both the motor and the engine in the HEV driving mode, and needs to be transmitted to the input shaft of the transmission. The present transmission input shaft request torque may be a driver requested torque which is determined based on the input shaft of the transmission.

Since the determination of a driver requested torque, that is, a transmission input shaft request torque value $(T_i)_{DMD}$ that needs to be transmitted from the driving source of the vehicle to the input shaft of the transmission, is a well-known process which is performed in a common control process of hybrid electric vehicles, a detailed explanation thereof will be omitted.

The HCU 20 performs speed control of the driving source of the vehicle so that the change rate of the transmission input speed tracks a target change rate (S15). In the EV driving mode, the HCU 20 performs speed control of the motor. In the HEV driving mode, the HCU 20 performs speed control of both the motor and the engine.

Here, the aforementioned target change rate, specifically, the target change rate of the transmission input speed, may be determined based on the vehicle driving information.

To the present end, the HCU 20 may be programmed to determine the target change rate of the transmission input speed based on the vehicle driving information. For example, the HCU 20 may determine the target change rate of the transmission input speed using predetermined data based on the current transmission input speed $N_M$ and the current transmission input torque $T_i$.

Here, the predetermined data may be a map prestored in the HCU 20.

The map is a set of data defining a relationship among the transmission input speed $N_M$, the transmission input torque $T_i$ and the target change rate of the transmission input speed using information obtained through testing and evaluation processes. The target change rate of the transmission input speed may be set in accordance with the transmission input speed $N_M$ and the transmission input torque $T_i$.

Furthermore, in the speed change period after the time point B, simultaneously with the speed control of the driving source by the HCU 20, the control device, for example, the TCU 40, feedforward-controls the transfer torque $T_A$ of the engagement element in the transmission (which is equal to the clutch torque $TC_A$ of the engagement element) (S14).

At the present time, to feedforward-control the transfer torque $T_A$ of the engagement element, the TCU 40 determines, generates and outputs a torque command value for feedforward-controlling the clutch of the engagement element based on the transmission input shaft request torque value $(T_i)_{DMD}$ transmitted from the HCU 20 (S13).

As described above, if the TCU 40 outputs a command value, the operation of the actuator for controlling the clutch of the engagement element is controlled in accordance with the command value output from the TCU (S14).

Here, the actuator may be a valve for controlling hydraulic pressure in an automatic transmission (AT) or a well-known actuator for controlling a clutch in a double-clutch transmission (DCT).

According to an exemplary embodiment of the present invention, in a process of determining a command value in the speed change period (step S13 in FIG. 8), the TCU 40 may be programmed to determine a base torque command value $(TC)_{BASE@(Ti)DMD}$ based on the transmission input shaft request torque $(T_i)_{DMD}$ and to determine a torque command value TC*, to which the base torque command value is reflected.

Here, the torque command value TC* may be determined from the following equation 2.

$$TC^* = (TC)_{BASE@(Ti)DMD} + (TC)_{COR} + dTC \times \Delta t_{A\text{-}B} + dTC_B \times t_B \qquad \text{Eq. 2}$$

In Equation 2, $(TC)_{BASE@(Ti)DMD}$ indicates a base torque command value that corresponds to the transmission input shaft request torque $(T_i)_{DMD}$ determined by the HCU 20, and $(TC)_{COR}$ denotes a torque command correction value.

Furthermore, dTC denotes a change inclination of the clutch torque TC of the engagement element (which is equal to the transfer torque $T_A$) in the period between A and B, $\Delta t_{A\text{-}B}$ denotes a time of the period between A and B, $dTC_B$ denotes a change inclination of the clutch torque TC of the engagement element (which is equal to the transfer torque $T_A$) after the time point B, and $t_B$ denotes an elapsed time period from the time point A to the current time point, at which the control is being performed.

The base torque command value $(TC)_{BASE@(Ti)DMD}$ may be determined by the TCU 40 through the map based on the transmission input shaft request torque $(T_i)_{DMD}$. The base torque command value $(TC)_{BASE@(Ti)DMD}$ may be determined through the map based on the current transmission input speed $N_M$, the current transmission input torque $T_i$, and the transmission input shaft request torque $(T_i)_{DMD}$.

The torque command correction value $(TC)_{COR}$ may include a learning correction value, which is obtained from a predetermined learning process, or a temperature correction value, which is obtained from a predetermined temperature correction logic. The torque command correction value $(TC)_{COR}$ may be obtained by the same process, method or logic as the torque command correction value in the period between A and B (i.e. the torque command correction value in Equation 1). The torque command correction value $(TC)_{COR}$ may be the sum of various correction values including the learning correction value, the temperature correction value and the like.

Furthermore, in Equation 2, $dTC \times \Delta t_{A\text{-}B}$ denotes an integrated value of the inclination in the period between A and B, and $dTC_B \times t_B$ denotes an increment value of the torque from the time point B to the current time point, at which the control is being performed.

Described in brief, as the torque command value for controlling the clutch in the transmission, the value determined from Equation 1 is used in the period between A and B, and the value determined from Equation 2 is used in the period between B and C.

As described above, unlike the related art, in which the torque command value for controlling the clutch of the engagement element is set to a fixed value or is increased at a constant inclination, the present invention is characterized in that the value determined from Equation 2 is used as the torque command value for controlling the clutch of the engagement element in the period between B and C.

Since the base torque command value $(TC)_{BASE@(Ti)DMD}$ is determined in accordance with the transmission input shaft request torque $(T_i)_{DMD}$, to which a driver's intention is applied, a driver's intention and a driver's driving manipulation are reflected to the overall torque command value TC* of the engagement element determined from Equation 2, including the base torque command value $(TC)_{BASE@(Ti)DMD}$.

As a result, the related art, as shown in FIG. 5, has a problem in that the transmission output torque $T_O$ and the transfer torque $T_A$ of the engagement element are all constant, whereby the acceleration of the vehicle is not changed despite manipulation of the accelerator pedal during the control and consequently the driver cannot feel a change in the acceleration of the vehicle despite stepping on the accelerator pedal, whereas the present invention, as shown in the period between B and C in FIG. 9, is characterized in that the transmission input shaft request torque value (i.e. the demanded transmission input torque value) $(T_i)_{DMD}$ increases when the driver tips in the accelerator pedal, whereby the transmission output torque $T_O$ and the transfer torque $T_A$ of the engagement element are all increased, the acceleration of the vehicle is changed, and consequently the driver is configured to feel the change in the acceleration of the vehicle when stepping on the accelerator pedal.

That is, according to an exemplary embodiment of the present invention, when the APS value increases due to driver's manipulation of the accelerator pedal, the base torque value and the clutch torque $TC_A$ of the engagement element, to which the base torque value is reflected, increase, leading to an increase in the transmission output torque $T_O$. Accordingly, it is possible to solve the problem with a conventional active gear shift control method, in which the driver cannot feel a change in the acceleration of the vehicle, and to achieve a more desirable result by preventing the clutch torque of the engagement element from decreasing due to feedback control to a level lower than that before the application of the active gear shift control.

Furthermore, although the transmission input speed $N_M$ may be changed due to the change in the clutch torque of the engagement element, the present invention is characterized in that the HCU 20 feedback-controls the speed of the driving source of the vehicle so that the change rate of the transmission input speed tracks the target change rate.

For example, if the clutch torque $TC_A$ of the engagement element (which is equal to the transfer torque $T_A$ of the engagement element) increases in accordance with the transmission input shaft request torque $(T_i)_{DMD}$ at the occurrence of a tip-in event in FIG. 9, the change rate of the transmission input speed decreases separately from the transmission input torque according to the relation of $T_i - TC_A = I_i \times \alpha_N$ (where $I_i$ denotes a rotational moment of inertia of the input shaft of the transmission and $\alpha_N$ denotes a change rate of the transmission input speed), and the input torque is controlled with respect to a predetermined target change rate of the transmission input speed. As a result, according to an exemplary embodiment of the present invention, if the clutch torque $TC_A$ of the engagement element increases, the transmission input torque $T_i$ is formed at a high level compared to that when the clutch torque $TC_A$ is a fixed value, preventing the transmission input speed from decreasing rapidly and minimizing impacts at the final process of the gear shift.

Subsequently, the time point C is the time point at which the synchronization is completed and a synchronized period is started, like the related art. The TCU 40 determines whether speed synchronization has been realized between the transmission input speed $N_M$ and a predetermined synchronous speed of a target shift range.

For example, if it is determined at the time point C that the condition "|transmission input speed $N_i$–synchronous speed|<reference value" has been continuously satisfied for a predetermined time period, it is determined that the synchronization at the target shift range has been realized and the synchronized period is started, in which the clutch torque $TC_A$ of the engagement element increases and the gear shift is finished (S16 and S17).

Here, the synchronous speed may be a predetermined speed which is set in the TCU 40 in accordance with a target shift range of the power-on upshift.

At the present time, the HCU 20 stops controlling the speed of the driving source of the vehicle and performs control such that a request torque value is output (S18). To reduce variation in torque, an increment limit or filtering may be applied.

Subsequently, the time point D is the time point at which the gear shift is completed. As indicated by the time point D, when the clutch torque $TC_A$ of the engagement element has a maximum value MAX and the clutch torque $TC_R$ of the release element becomes 0, or when a predetermined time period has elapsed since the time point C, it is determined that the gear shift has been completed (S19).

At the time point D, at which the gear shift has been completed, the TCU completely finishes controlling the clutch of the transmission (S20).

Although the occurrence of the tip-in event in the period between B and C, in which the driver steps on the accelerator pedal, is illustrated in FIG. 9, when the tip-out event occurs such that the driver gradually releases the accelerator pedal, a torque command value for controlling the clutch of the engagement element (control of the clutch torque and the transfer torque) is also determined based on the transmission input shaft request torque value, to which a driver's intention is reflected. Accordingly, a change in the acceleration of the vehicle may also occur, and consequently the driver may feel the deceleration state of the vehicle.

As a result, according to an exemplary embodiment of the present invention, since a driver's acceleration/deceleration intention is reflected in the speed change period during the power-on upshift active control operation, it is possible to improve acceleration/deceleration drivability.

As is apparent from the above description, various aspects of the present invention are directed to providing a method for controlling gear shifting of a hybrid electric vehicle, in which a reduced gear-shifting time, minimized loss by the drive system, improved fuel efficiency and enhanced drivability are accomplished, in which a torque command value for controlling a clutch of an engagement element (control of clutch torque and transfer torque) is determined based on a transmission input shaft request torque value, to which a driver's intention is reflected, and in which transmission output torque is changed in accordance with driver's driving manipulation (i.e. manipulation of the accelerator pedal), facilitating the vehicle to be accelerated or decelerated in accordance with the driver's driving manipulation during power-on upshift active control operation and consequently facilitating the driver to feel the acceleration/deceleration state of the vehicle depend on his or her driving manipulation.

That is, according to an exemplary embodiment of the present invention, since a driver's acceleration/deceleration intention is reflected in the speed change period during the power-on upshift active control operation, it is possible to improve acceleration/deceleration drivability.

Furthermore, a transmission input speed is feedback-controlled through speed control of a driving source, and clutch torque of an engagement element in a transmission is feedforward-controlled to be proportional to a driver requested torque. Therefore, unlike a conventional power-on upshift control method, in which an active gear shift control operation is not performed and acceleration/deceleration of the vehicle is performed irrespective of a driver requested torque because a transmission input speed is feedback-controlled through clutch torque control, the present invention has an effect of transferring the change in the acceleration of the vehicle to the driver in accordance with the driver's intention and driving manipulation.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling gear shifting of a hybrid electric vehicle, the method comprising:
    starting gear shift control for power-on upshift to a target shift range;
    determining whether slip of a release element in a transmission has occurred after the starting the gear shift control;
    determining a transmission input shaft request torque value based on vehicle driving information detected by a driving information detection device in a speed change period in which a transmission input speed decreases due to occurrence of the slip of the release element;
    determining a command value for controlling a clutch torque of an engagement element in the transmission based on the determined transmission input shaft request torque value;
    performing speed control of a driving source of a vehicle so that the clutch torque of the engagement element is configured to be controlled in accordance with the determined command value in the speed change period and a change rate of the transmission input speed tracks a target change rate; and
    upon determining that synchronization has been realized between the transmission input speed and a predetermined synchronous speed of the target shift range by the speed control, stopping the speed control and increasing the clutch torque of the engagement element.

2. The method of claim 1, wherein, when a current speed of the vehicle is greater than a predetermined reference value of the target shift range, the gear shift control for the power-on upshift is started.

3. The method of claim 1, wherein, when the gear shift control is started, a clutch torque of the release element is determined to be decreased and the clutch torque of the engagement element is configured to be increased.

4. The method of claim 1, wherein, in the determining whether the slip of the release element has occurred, when a decrease in the transmission input speed is detected, the slip of the release element is determined to have occurred.

5. The method of claim 1, wherein, in the determining transmission input shaft request torque value, the transmission input shaft request torque value is determined based on information related to a manipulated state of an accelerator pedal detected by an accelerator position detector.

6. The method of claim 1, wherein, in the performing the speed control of the driving source of the vehicle, the target change rate is set to a value corresponding to a current transmission input speed and a current transmission input torque.

7. The method of claim 1, wherein the determining the command value for controlling the clutch torque of the engagement element includes:
   determining a base torque command value that corresponds to the determined transmission input shaft request torque value; and
   determining a command value for controlling the clutch torque of the engagement element using the determined base torque command value.

8. The method of claim 7, wherein the command value TC* for controlling the clutch torque of the engagement element is determined as follows:

$$TC^* = (TC)_{BASE@(Ti)DMD} + (TC)_{COR} + dTC \times \Delta t_{A-B} + dTC_B \times t_B$$

where $(TC)_{BASE@(Ti)DMD}$ is the base torque command value that corresponds to the transmission input shaft request torque value, $(TC)_{COR}$ is a torque command correction value including a learning correction value obtained from a learning logic or a temperature correction value obtained from a temperature correction logic, dTC is a change inclination of the clutch torque of the engagement element from start of the gear shift control to determination of occurrence of the slip, $\Delta t_{A-B}$ is a time period from start of the gear shift control to determination of occurrence of slip, $dTC_B$ is a change inclination of the clutch torque of the engagement element after occurrence of slip, and $t_B$ is an elapsed time period from determination of occurrence of the slip to a current control time point.

9. The method of claim 7, wherein, in the determining the base torque command value, the base torque command value is determined through a map based on the determined transmission input shaft request torque value, a current transmission input speed and a current transmission input torque.

* * * * *